(12) United States Patent
Loughran

(10) Patent No.: US 6,898,477 B2
(45) Date of Patent: May 24, 2005

(54) SYSTEM AND METHOD FOR PERFORMING ADAPTIVE MODIFICATION OF RAPID PROTOTYPING BUILD FILES

(75) Inventor: Stephen A. Loughran, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/641,459

(22) Filed: Aug. 14, 2003

(65) Prior Publication Data

US 2005/0038549 A1 Feb. 17, 2005

(51) Int. Cl.[7] .............................................. G06F 19/00
(52) U.S. Cl. ....................................... 700/119; 264/401
(58) Field of Search ................................ 700/119, 120; 264/401

(56) References Cited

U.S. PATENT DOCUMENTS 5,398,193 A * 3/1995 deAngelis .................. 700/119
5,510,066 A * 4/1996 Fink et al. ................. 264/40.1
6,207,097 B1 * 3/2001 Iverson ...................... 264/401

OTHER PUBLICATIONS

Morvan, Stephane M. and George M. Fadel, "IVECS, Interactively Correcting .STL Files in a Virtual Environment." Solid Freeform Fabrication Proceedings, 1996, p. 491–498.

* cited by examiner

Primary Examiner—Leo Picard
Assistant Examiner—Sheela S. Rao

(57) ABSTRACT

A system and method is provided for performing adaptive modification of rapid prototyping build files. The method includes the step of reading a rapid prototyping build file that stores a digital description of a three dimensional object. The invention also includes the operation of selecting a build file correction algorithm from a plurality of build file correction algorithms. Defects in the rapid prototyping build file are identified and these defects are then corrected based on the selected build file correction algorithm.

25 Claims, 4 Drawing Sheets

SYSTEM AND METHOD FOR PERFORMING ADAPTIVE MODIFICATION OF RAPID PROTOTYPING BUILD FILES

FIELD OF THE INVENTION

The present invention relates generally to modifying rapid prototyping build files.

BACKGROUND OF THE INVENTION

Rapid prototyping is the name given to an assortment of related techniques used to fabricate physical objects from computer aided design (CAD) representations of the objects. Just as a printer can take a digital representation of an image and create a two dimensional hard copy, rapid prototyping machines can 'print', or add and bond materials in layers to form three dimensional hard objects. Other names for creating a three dimensional prototype in this manner include freeform fabrication, solid freeform fabrication, layered manufacturing, automated fabrication, solid imaging, and additive manufacturing.

The techniques used in rapid prototyping offer numerous advantages over subtractive fabrication methods such as milling or turning. For example, an object with significant geometric complexity can be fabricated without the elaborate machine setup or final assembly required in subtractive fabrication. Rapid prototyping is also powerful because an object can be made from multiple materials and the materials can be varied in a controlled fashion at substantially any location in the object. Rapid prototyping systems reduce the construction of complex objects to a manageable, straightforward, and relatively fast process. These properties have resulted in the use of rapid prototyping as a way to reduce time to market in manufacturing by helping engineers to better understand and communicate their product designs.

The process of creating a rapid prototyping object often begins with converting a CAD file into a file understood by a rapid prototyping machine. A common file format used in rapid prototyping is the stereo lithographic (STL) format. An STL file is constructed from a CAD model of an object by approximating all the surfaces of the object with a mesh of triangular facets and writing out the nodes and outward normals of each triangular facet to a text or binary file. The STL file format was adopted as the industry standard input to rapid prototyping systems because STL files are simple to construct and because of the availability of robust algorithms for tessellating numerous different CAD file formats to the STL file format.

An accurate STL file can conform to at least the following guidelines. First, triangles should generally intersect only at their edges, and each triangle edge should preferably be shared by two and only two triangles. In other words, adjacent triangles are arranged with two vertices in common. Second, every triangle obeys the right-hand rule, which means that the vertices are ordered such that the cross product of the two edges gives an outward normal. This implies that the triangles are actual triangles, not points or lines, which are both degenerate states of a triangle when two or more vertices are identical.

A solid part is also devoid of extraneous holes. The appropriate way to represent an object with an accessible interior is to explicitly describe the surface of the interior of the object with more triangles. When these conditions are not satisfied, the STL file may be considered faulty and the virtual model generated by the STL file may not be physically valid.

There are other issues which relate directly to manufacturability. Even if a file is mathematically 'valid', if the part walls are too thin, the part will break under minor stresses. Similarly, if two walls of a part abut each other, they may be intended to be joined, but such intent is not included in the STL file.

Faulty STL files can be the result of problems in the original CAD file or imperfections in the algorithm used to tessellate the CAD model into an STL file. For example, a poor tessellation algorithm often results in disoriented facets that can lead to physical irregularities in the manufactured object. Other problems occur because of mathematical rounding errors during the tessellation process. If the rounding errors result in triangles that are too small, then gaps or holes may be formed in the model. If the rounding errors result in triangles that are too large, then excess material may be deposited and the surface will be irregular.

Errors can also result from the CAD user's ignorance of STL file requirements regarding internal walls or the errors may be an artifact of the CAD design tool. An internal wall problem does not hinder the building of the object but it may cause problems in the finished prototype. Such is the case when using a rapid prototyping process in which a laser beam hardens the resin. The laser beam may polymerize the areas having internal walls twice, resulting in over-cure and possible warping of internal wall surfaces. These and many other errors can result in reduced utility or even useless objects formed in freeform fabrication.

Finally, errors can be created in the process of generating rapid prototyping files from non-CAD processes. As an example, a three dimensional part can be viewed on the screen in a file format known as VRML ("Virtual Reality Markup Language") and such files can often be converted to STL or other rapid prototyping formats via the appropriate tools. However, because the original destination of the part was the screen, the original design is likely to contain errors that are invisible when displayed on screen, which prevent the part from being manufactured. Zero-width walls are one such problem, and holes or inverted polygons (i.e., bad normals) are another problem. The conversion process may introduce more problems, especially if the conversion can only handle a subset of the original file format. VRML includes complex objects such as curves and two-dimensional 'billboards' with animated content, so converting these to a rapid prototyping format can range from hard to impossible.

Several different approaches have been taken to fix faulty STL files and to improve the fabrication of the objects described by the STL files. One common approach is to have a rapid prototyping machine operator fix the errors by directly editing the STL file with an STL File editor tool, but there are several disadvantages to taking this approach. Manually correcting STL files is time consuming, which adds to the cost of the finished prototype. Also, operators occasionally create additional errors while fixing previous errors. Historically, rapid prototyping machines have been used to develop prototypes based on CAD models of mechanical objects. Therefore, most rapid prototyping machine operators are skilled at editing STL files intended for mechanical use, but these operators may not have experience in fixing STL files intended for other uses. Unless the STL file is intended for a mechanical use, the original intentions of the designer might not be preserved in the changes made by the operator.

Software programs are also available for automatically correcting errors in rapid prototyping build files. The problems associated with using these software programs are similar to the problems with using an operator. Although the software programs can be faster than operators, most software correction algorithms are geared toward correcting build files that describe mechanical objects.

SUMMARY OF THE INVENTION

The present invention provides a system and method for performing adaptive modification of rapid prototyping build files. The method includes the operation of reading a rapid prototyping build file that stores a digital description of a three dimensional object. A further operation is selecting a build file correction algorithm from a plurality of build file correction algorithms. Defects in the rapid prototyping build file are identified and these defects are then corrected based on the selected build file correction algorithm.

DETAILED DESCRIPTION

Figure 1:
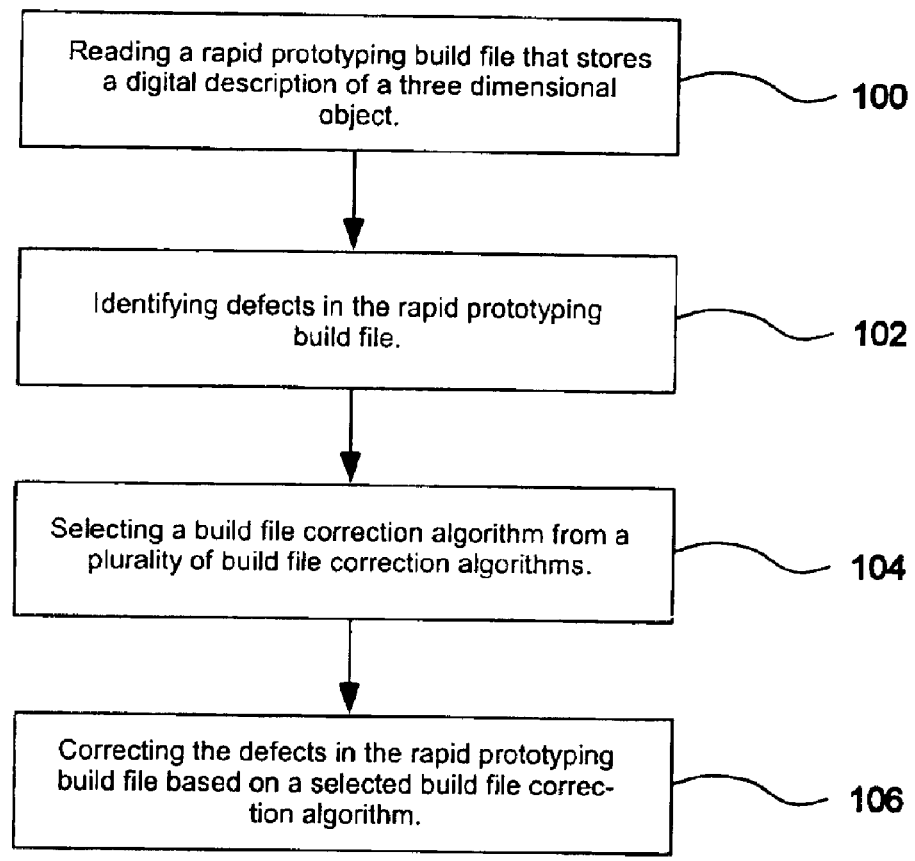
FIG. 1 is a flow chart illustrating a method for performing adaptive modification of rapid prototyping build files in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the concepts of the inventions as illustrated herein, which would occur to one skilled in the relevant art and having possession of this disclosure, are to be considered within the scope of the invention.

The present invention provides a system and method for performing adaptive modification of rapid prototyping build files. The invention allows a user or a computer to select a build file correction algorithm from a set of multiple correction algorithms, which provides greater flexibility to designers and engineers. This greater flexibility can help to better preserve the designer's intents and to build more accurate prototypes Rapid prototyping build files are created by tessellating polygons or geometric areas (e.g. geometric curves) for a digital description of a three dimensional object from a design format to a format readable by a rapid prototyping machine. Because no perfect tessellation algorithms exist, errors are often introduced into the rapid prototyping build file during the tessellation process. Errors in rapid prototyping build files can also be the result of computer rounding errors or of a design file that is not properly prepared for tessellation. The process of fixing these errors includes reading a rapid prototyping build file that stores a digital description of a three dimensional object, as shown in block 100 of FIG. 1. The rapid prototyping build file can be stored in any type of electronic storage medium and read from the storage medium by a computer.

After the rapid prototyping build file is read, the defects in the build file are identified, as shown in block 102. The errors are identified by a module capable of searching the build file and finding defects. Although rapid prototyping build files may use meshes of connected polygons to describe objects, correcting defects in a build file is more than a matter of simply adding or removing polygons. The number of polygons used to describe any surface is variable, and the polygons can be aligned in many different ways. Therefore, each error in the rapid prototyping build file can be corrected in many different ways, and how these errors are corrected can determine properties of the finished prototype.

The present invention provides two or more build file correction algorithms with different approaches to fixing errors or making modifications. Block 104 illustrates the operation of selecting a build file correction algorithm from a plurality of build file correction algorithms. Multiple unique build file correction algorithms can be developed and included in this set of algorithms, and each build file correction algorithm can be designed to fix the rapid prototyping build file based on an intended use of the object. In an alternative embodiment of the invention, a build file modification algorithm can be used in place of the correction algorithm.

The operation of identifying defects 102 and the operation of selecting a build file correction algorithm 104 can be interchanged in order. When the errors are identified and a correction algorithm is selected, the defects in the rapid prototyping build file are corrected based on the selected build file correction algorithm, as shown in block 106. Since the correction algorithms are not limited to correcting build files that represent objects intended for mechanical uses, designers of objects intended for other uses have correction algorithms that can better meet their needs. This diversity of correction options is advantageous because designers from diverse fields now use rapid prototyping to create three dimensional prototypes.

The present invention eliminates the need for manual correction of errors and provides flexibility in correcting errors in rapid prototyping build files. The present invention provides architects, industrial designers, surgeons and individuals from many other disciplines with the ability to choose correction algorithms that suit their particular needs.

Figure 2:
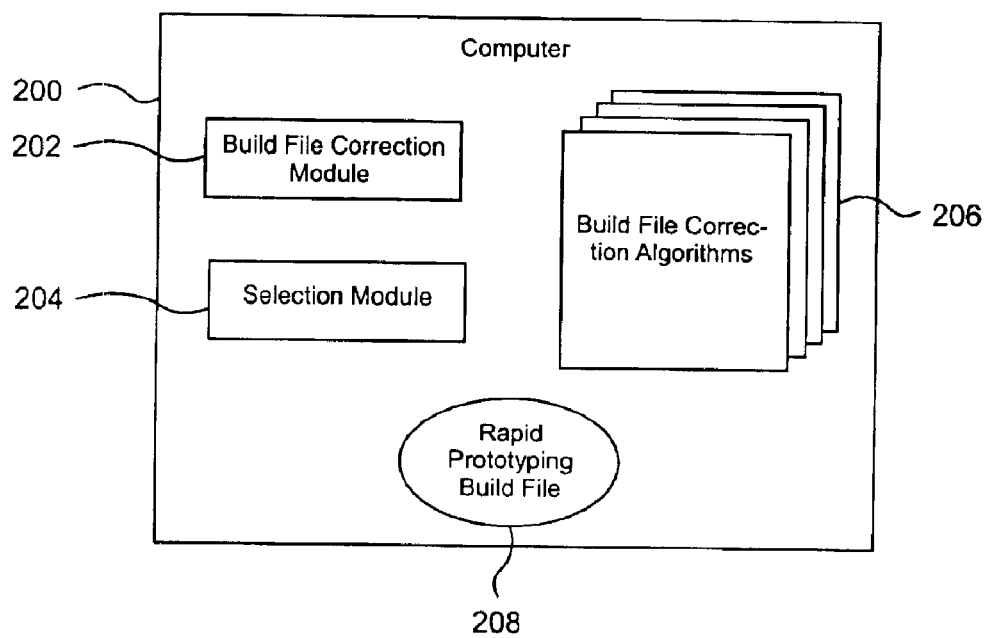
FIG. 2 is a block diagram illustrating an embodiment of a system for performing adaptive modification of rapid prototyping build files.

An embodiment of a system for automating the correction or modification of rapid prototyping build files with a computer 200 including a build file correction module 202 is shown in FIG. 2. A rapid prototyping build file 208 is stored on the computer, and the build file can be in any format understood by a rapid prototyping machine. Depending on the rapid prototyping machine, the build file may be in STL format, RPI format, or any other format used in rapid prototyping. The rapid prototyping build file formats can use polygonal meshes to represent three dimensional objects, and in one embodiment of the invention these polygons can be triangles. In another embodiment of the invention, geometric curves or cubic patches can be use to represent the three dimensional objects.

Also included in the present invention is a set of build file correction algorithms 206 for correcting defects in the rapid prototyping build file 208. The build file correction algorithms are accessible by the computer 200 that performs the corrections. As previously mentioned, the errors in rapid prototyping build files can often be corrected in many different ways.

The present invention enables the computer system or the user to determine which build file correction algorithm will be used. One way to determine which build file correction algorithm to use is by selecting a build file correction algorithm based on an intended use of the prototype. If the finished prototype is related to MRI or CAT scan technologies, the build file can be optimized for such technologies. If a designer wants the build file to be aesthetically pleasing, the build file can be optimized for visual appeal. Other algorithms can optimize rapid prototyping build files for mechanical precision, medical devices, architectural design, or for providing durability and longevity.

Another way to choose a build file selection algorithm is by basing the selection of a build file on who designed the object described in the build file. For example, if a designer always wants their build files to be optimized for mechanical precision, a selection module 204 can recognize the designer associated with the build file and choose to optimize the build file for mechanical precision. Designers can also choose to have their build files associated with a custom-made build file correction algorithm. Selecting correction algorithms in this way helps to preserve the designer's original intent.

The build file correction algorithm can also be selected based on properties of the three dimensional object. If certain parts are thin and fragile in the object, the algorithm can ensure that these parts are reinforced. Different correction algorithms can also be used on different portions of a single build file, depending on the properties of each portion. No matter what criteria are used to select a correction algorithm, the build file correction algorithm can be selected programmatically by a computer or manually by a user. The selection module 204 can include a user interface that allows a user to select a build file correction algorithm.

The build file correction algorithms 206, the selection module 204, and the rapid prototyping build file 208 are all stored on the computer 200. The computer is any type of computing device capable of manipulating the rapid prototyping build file. The computer can be the computer used by the designer to create a three dimensional description of the object, the computer used in tessellation, or any other computer. In one embodiment of the invention, the computer is part of the rapid prototyping machine.

Figure 3:
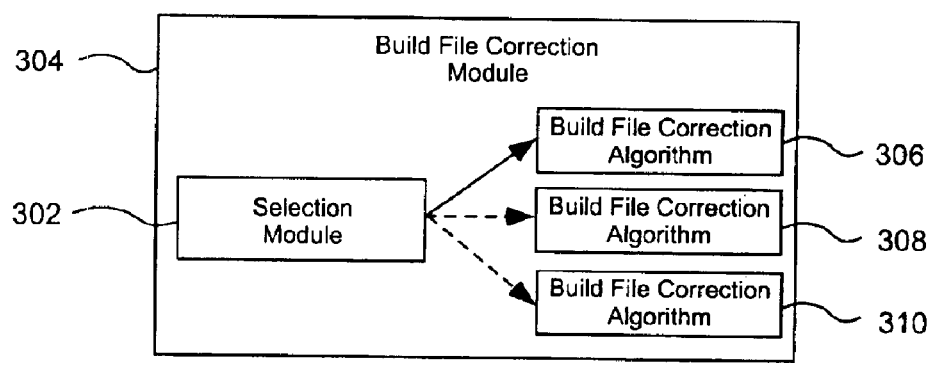
FIG. 3 is a block diagram illustrating a system for selecting a build file correction algorithm according to an embodiment of the invention.

In the embodiment shown in FIG. 2, the build file correction module, the selection module, and the build file correction algorithms are all separate modules. While FIG. 2 shows that they are used and stored on a single computer, they can be stored in different locations on a network, on a disk, or in any other electronic medium accessible by the computer. The embodiment shown in FIG. 3 illustrates an embodiment where the selection module 302 and the build file correction algorithms 306, 308, 310 are part of the build file correction module 304. In addition, FIG. 3 illustrates that one build file correction algorithm 306 can be selected but the dotted arrows illustrate that the other build file correction algorithms 308, 310 can be selected as needed.

Figure 4:
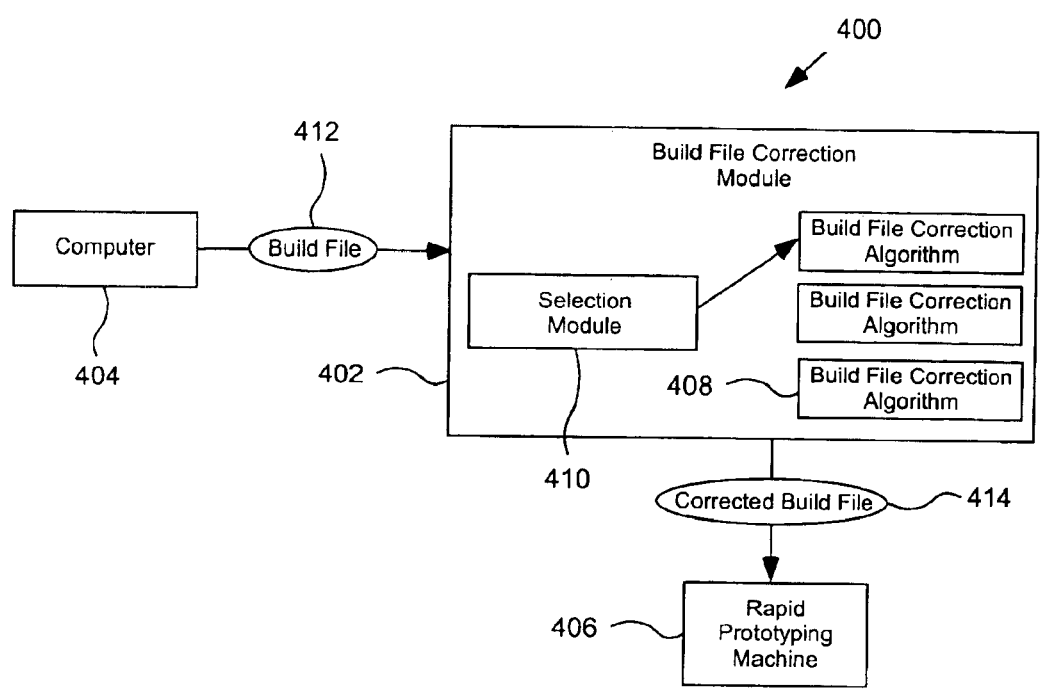
FIG. 4 is a block diagram illustrating an embodiment of the present invention for performing adaptive modification of rapid prototyping build files.

FIG. 4 illustrates a system 400 in accordance with embodiments of the invention for taking the build file from a computer to make a prototype of the object described by the build file. A computer 404 sends the build file 412 to a build file correction module 402. The build file correction module can execute on the computer with the build file or on a separate computer. The selection module 410 picks a build file correction algorithm 408, and the rapid prototyping build file is corrected to make a corrected build file 414. The rapid prototyping machine 406 receives the corrected build file and can fabricate the prototype.

Figure 5:
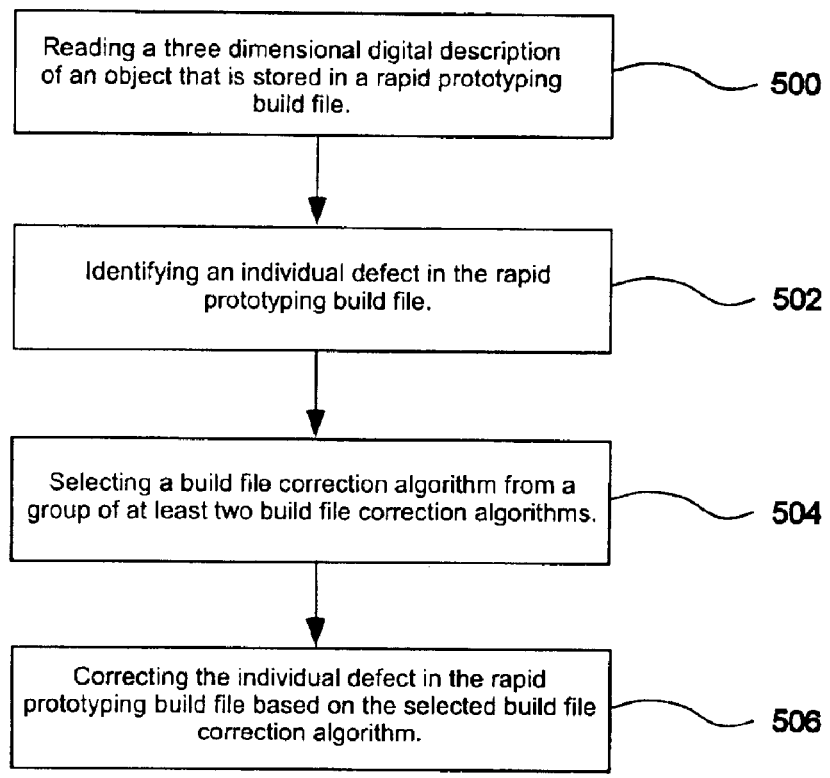
FIG. 5 is a flow chart illustrating an embodiment of a method for performing adaptive modification of individual defects in rapid prototyping build files.

According to another embodiment of the invention, individual defects or groups of defects can be corrected by separate algorithms, as illustrated by FIG. 5. This provides the advantage of optimizing different portions of a prototype in different ways. Block 500 shows the operation of reading a three dimensional digital description of an object that is stored in a rapid prototyping build file. Individual defects in the rapid prototyping build file are identified, as shown in block 502. Many different kinds of errors can occur in rapid prototyping build files. Some errors occur because the ends of vectors or geometric constructs are not aligned. Sometimes geometric constructs, such as polygons, are missing and leave holes in the prototype. Sometimes build files also have extra polygons or spurious polygons.

In order to correct these errors, the operation of selecting a build file correction algorithm from a group of at least two build file correction algorithms is performed, as in block 504. The individual defects in the rapid prototyping build file are corrected based on the selected build file correction algorithm, as in block 506. The defect of extra or spurious polygons can be corrected by removing or realigning polygons. If it is essential that a particular edge be smooth, the algorithm can smooth the curves outlined by the polygons that define the edge. Also, areas with missing polygons can be filled with additional polygons, and polygons with mismatched ends can be aligned to a single point. These corrections can be made until all the defects in the rapid prototyping build file are fixed.

The present invention can be applied to any of the numerous rapid prototyping techniques available. Among these are stereo lithography (SLA for stereo lithography apparatus), selective laser sintering (SLS), fused deposition modeling (FDM), laminated object manufacturing (LOM), inkjet-based systems and three-dimensional printing (3DP). Each of these technologies has its singular strengths and weaknesses, and each of these technologies can produce better prototypes when adaptive correction of build files is performed before fabrication.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for performing adaptive modification of rapid prototyping build files, comprising the steps of:
   reading a rapid prototyping build file that stores a digital description of a three dimensional object;
   identifying defects in the rapid prototyping build file;
   selecting a build file correction algorithm from a plurality of build file correction algorithms; and
   correcting the defects in the rapid prototyping build file based on the selected build file correction algorithm.

2. A method as in claim 1, wherein the step of selecting a build file correction algorithm further comprises the step of selecting a build file correction algorithm based on an object's intended use.

3. A method as in claim 1, wherein the step of selecting a build file correction algorithm further comprises the step of selecting a build file correction algorithm manually.

4. A method as in claim 1, wherein the step of selecting a build file correction algorithm further comprises the step of selecting a build file correction algorithm with a computer using an automated selection process.

5. A method as in claim 4, wherein the step of selecting a build file correction algorithm with a computer further comprises the step of selecting a build file correction algorithm based on an author associated with the rapid prototyping build file.

6. A method as in claim 4, wherein the step of selecting a build file correction algorithm further comprises the step of selecting a build file correction algorithm based on properties of the three dimensional object.

7. A method as in claim 1, wherein the step of correcting the defects in the rapid prototyping build file further comprises the step of identifying mismatched ends of polygons and aligning them all to a single point in the rapid prototyping build file.

8. A method as in claim 1, wherein the step of correcting the defects in the rapid prototyping build file further comprises the step of filling in regions where polygons are missing in the rapid prototyping build file.

9. A method as in claim 1, wherein the step of correcting the defects in the rapid prototyping build file further comprises the step of smoothing the curves outlined by polygons in the rapid prototyping build file.

10. A method as in claim 1, wherein the step of correcting the defects in the rapid prototyping build file further comprises the step of removing spurious polygons in the rapid prototyping build file.

11. A method as in claim 1, wherein the step of reading a rapid prototyping build file further comprises the step of reading a rapid prototyping build file that is stored in a build file in stereo lithographic (STL) format.

12. A method as in claim 1, further comprising the step of supplying multiple unique build file correction algorithms to form a set of build file correction algorithms to correct the rapid prototyping build file based on an intended use of the object.

13. A method as in claim 12, wherein the step of supplying multiple unique build file correction algorithms further comprises the step of supplying a build file correction algorithm that optimizes build files for MRI and CAT scan technologies.

14. A method as in claim 12, wherein the step of supplying multiple unique build file correction algorithms further comprises the step of supplying a build file correction algorithm that optimizes build files for mechanical precision.

15. A method as in claim 12, wherein the step of supplying multiple unique build file correction algorithms further comprises the step of supplying a build file correction algorithm that optimizes build files for visual appeal.

16. A method as in claim 12, wherein the step of supplying multiple unique build file correction algorithms further comprises the step of supplying a build file correction algorithm that optimizes rapid prototyping build files for architectural designs.

17. A method as in claim 12, wherein the step of supplying multiple unique build file correction algorithms further comprises the step of supplying a build file correction algorithm that optimizes rapid prototyping build files for durability and longevity.

18. A system for automating the correction of rapid prototyping build files with a computer, comprising:

a rapid prototyping build file stored on the computer;

a set of build file correction algorithms containing a plurality of build file correction algorithms, wherein the build file correction algorithms are stored on the computer;

a selection module in the computer configured to select a build file correction algorithm from the set of build file correction algorithms; and a build file correction module stored on the computer, the build file correction module being configured to apply a selected build file correction algorithm to the rapid prototyping build file.

19. A system as in claim 18, wherein the computer is part of a rapid prototyping machine.

20. A system as in claim 18, wherein the selection module further comprises a user interface that allows a user to select a build file correction algorithm.

21. A system as in claim 18, wherein the selection module is capable of programmatically selecting a build file correction algorithm.

22. A method for performing adaptive correction of individual defects in rapid prototyping build files, comprising the steps of:

reading a rapid prototyping build file that stores a digital description of a three dimensional object;

identifying an individual defect in the rapid prototyping build file;

selecting a build file correction algorithm from a group of at least two build file correction algorithms; and correcting the individual defect in the rapid prototyping build file based on a selected build file correction algorithm.

23. A method as in claim 22, further comprising the step of repeating the steps of identifying an individual defect, selecting a build file correction algorithm, and correcting the individual defect until all of the defects in the rapid prototyping build file are corrected.

24. An article of manufacture, comprising:

a computer usable medium having computer readable program code embodied therein for performing adaptive modification of rapid prototyping build files, the computer readable program code means in the article of manufacture comprising:

computer readable program code for reading a rapid prototyping build file that stores a digital description of a three dimensional object;

computer readable program code for selecting a build file correction algorithm from a plurality of build file correction algorithms;

computer readable program code identifying defects in the rapid prototyping build file; and computer readable program code for correcting the defects in the rapid prototyping build file based on the selected build file correction algorithm.

25. A system for automating the correction of rapid prototyping build files with a computer, comprising:

a rapid prototyping build file stored on the computer;

a plurality of build file correction algorithms containing at least two build file correction algorithms, wherein the build file correction algorithms are stored on the computer;

a selection module means in the computer for selecting a build file correction algorithm from the plurality of build file correction algorithms; and a build file correction means stored on the computer, wherein the build file correction means is for applying selected build file correction algorithm to create a corrected rapid prototyping build file.

* * * * *